Dec. 16, 1930.  H. ROCKS, JR  1,785,363
AUTO THRILLER AND AMUSEMENT APPARATUS
Filed May 14, 1929   3 Sheets-Sheet 1
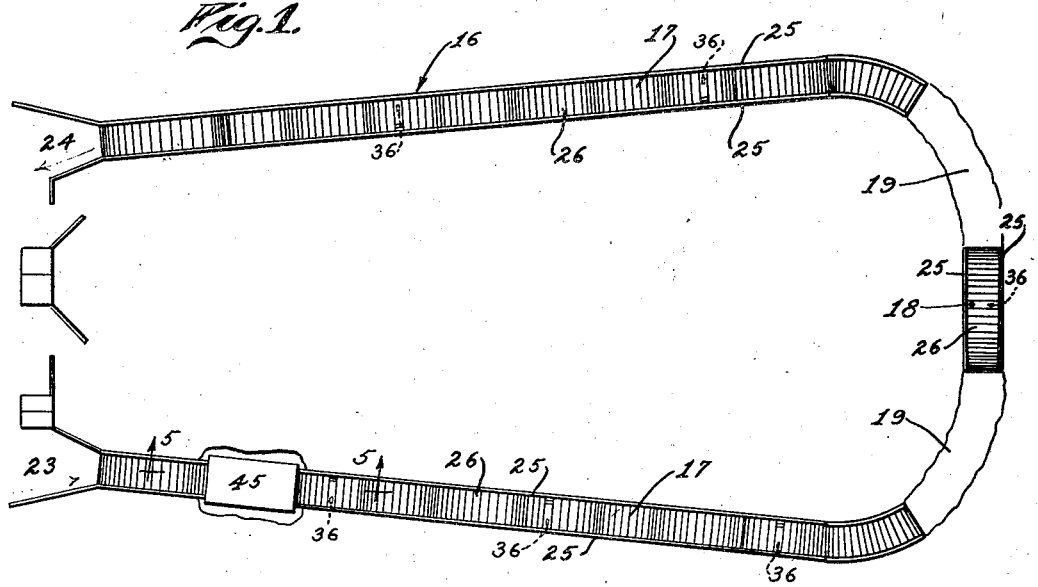
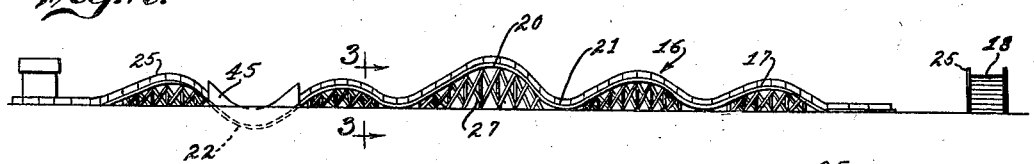
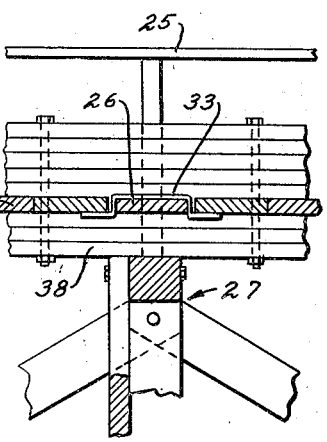
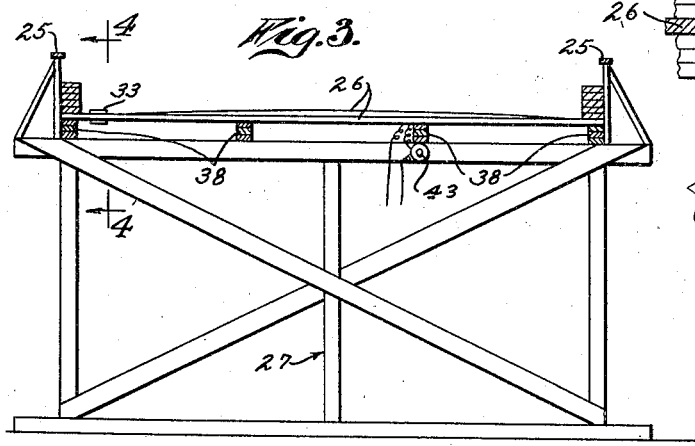
Inventor
Harry Rocks Jr.
Lyon & Lyon
Attorneys

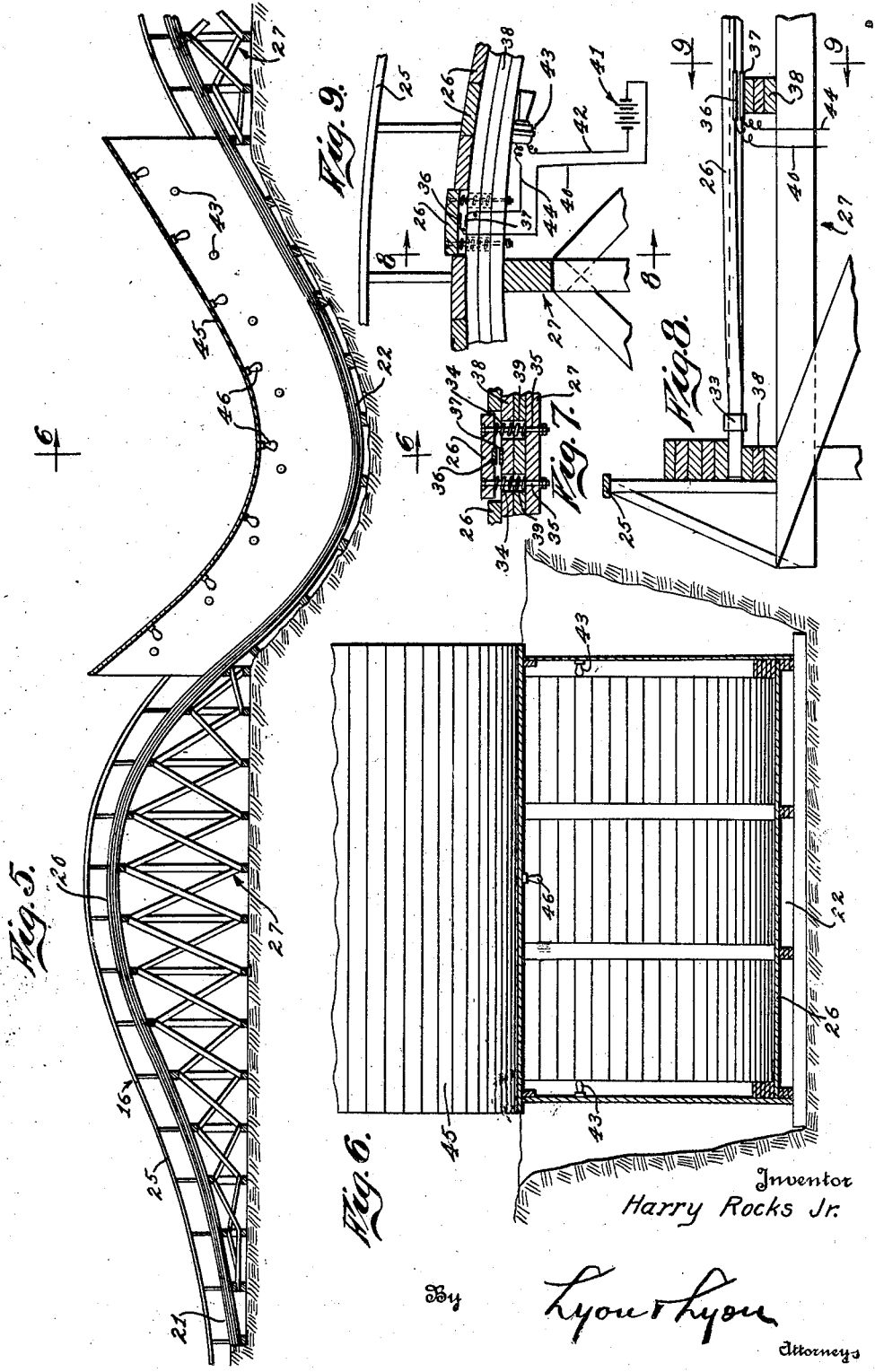

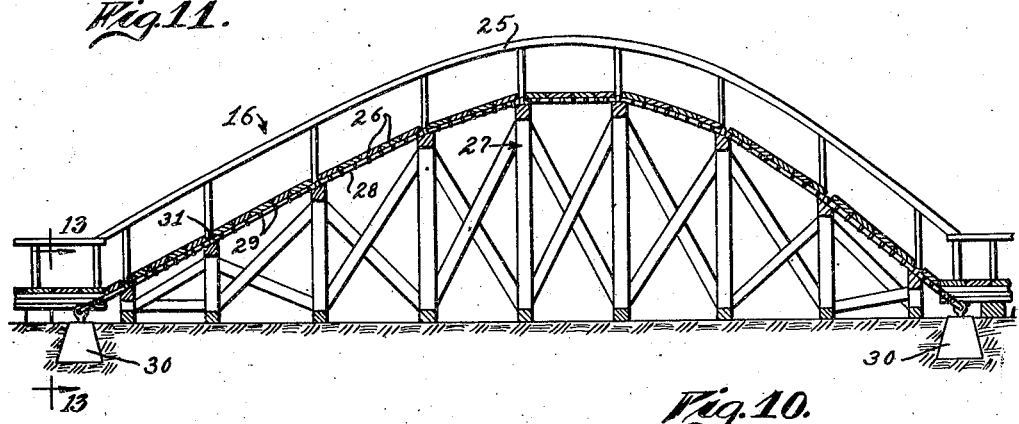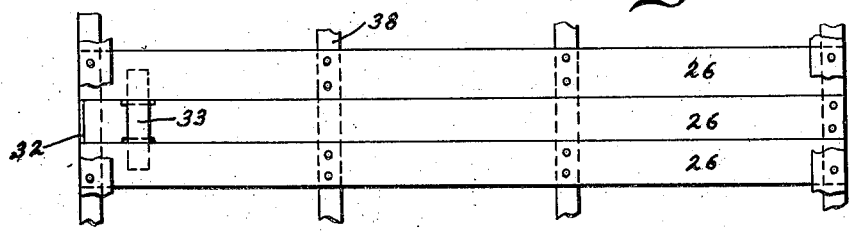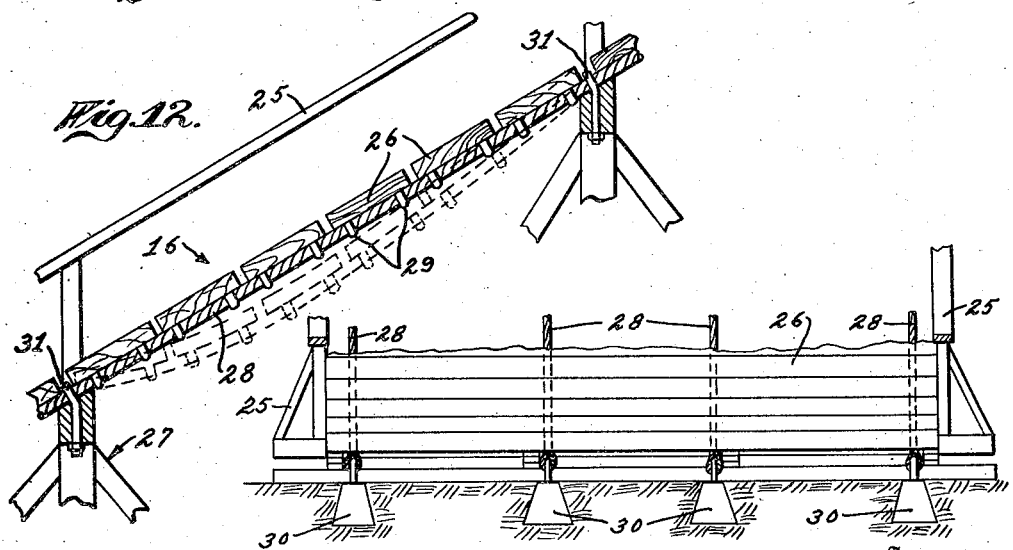

Patented Dec. 16, 1930

1,785,363

UNITED STATES PATENT OFFICE

HARRY ROCKS, JR., OF TORRANCE, CALIFORNIA

AUTO THRILLER AND AMUSEMENT APPARATUS

Application filed May 14, 1929. Serial No. 362,889.

This invention relates to auto thrillers and amusement apparatus and, in general, an object of the invention is to provide an apparatus of this type that has a high degree of safety and that, at the same time, will afford a maximum degree of recreational diversion to those who travel upon the apparatus.

One of the objects of the invention is to give a wave-like motion to automobiles that traverse the apparatus.

Another object is to provide a flexible runway that will yield somewhat under the weight of an automobile so that flexing of the runway will of itself produce a wave-like motion affecting the automobile that traverses said runway.

Another object is to make provision for the operation of sound producers and/or production of visible signals, by the automobile that traverses the apparatus.

Other objects and advantages will appear in the subjoined detailed description.

The accompanying drawings illustrate the invention.

Figure 1 is a plan view of an apparatus constructed in accordance with the provisions of this invention.

Figure 2 is a front elevation of Figure 1.

Figure 3 is an enlarged vertical section on the line indicated by 3—3, Figure 2.

Figure 4 is an enlarged vertical view, partly in section, viewed from the line indicated by 4—4, Figure 3.

Figure 5 is an enlarged fragmental longitudinal section on the line indicated by 5—5, Figure 1.

Figure 6 is an enlarged vertical section on the line indicated by 6—6, Figure 5.

Figure 7 is an enlarged sectional detail of one of the switches.

Figure 8 is a large fragmental view, partly in section, of one portion of the apparatus that controls one of the switches, the view being taken on the line indicated by 8—8, Figure 9.

Figure 9 is a vertical view, mainly in section, on the line indicated by 9—9, Figure 8.

Figure 10 is a fragmental plan view, showing a portion of the runway provided with a switch operating member.

Figure 11 is a fragmental longitudinal section illustrating a yielding section of the runway.

Figure 12 is an enlarged view of a portion of Figure 11 to better show the construction, solid lines indicating the position of the runway without a load imposed thereon and broken lines indicating said runway as deflected by a load passing thereover.

Figure 13 is an enlarged vertical view, partly in section, on the line indicated by 13—13, Figure 11.

Referring to the drawings, there is provided a runway, indicated in general by the character 16, said runway, in this instance, comprising two opposed complimentary sections 17 and an intermediate section 18 spaced from the sections 17, the spaces being indicated at 19; and said spaces providing earth road surfaces for passage of the automobiles from one section 17 to the section 18 and from said section 18 to the other section 17. The runway is of the hill and dale type, the hills being indicated at 20 and the dales at 21 and, in this instance, at least some of the hills are of different sizes. In one instance, the dale 21 dips below the surface of the earth, as indicated at 22. The ends of the sections 17 are spaced and at one end of the runways are entrance and exit 23, 24.

Opposite sides of the runway sections are preferably provided with guard rails 25 so as to insure against automobiles traversing the runway running off the same. The runway comprises cross members 26 which may be constructed of wood or any other suitable material and said cross members are suitably supported by a frame work 27.

There is shown in detail in Figures 10 and 11 a preferred construction for the runway or, at least, a portion thereof. In this instance, a number of cables 28 (in this instance, four) are stretched lengthwise of the frame 27, said cables, in this instance, being at one of the hill portions of the runway. On these cables are mounted a number of cross members 26 which are secured to the cables by U-bolts 29, or their equivalents. The cross members 26 are spaced somewhat from one another so as to permit flexing of the cables, as indicated in broken lines in Figure 12. The cables are anchored at their opposite ends to anchor members 30 embedded in the earth, and said cables pass through eye-bolts 31 which are fixed to the frame 27, as clearly shown in Figure 12.

At any desired intervals certain of the cross members 26 are secured at one end only and the other end is left free, as indicate at 32, to permit of sliding of said end upon the supporting cable or other member 28. The free end of each of said cross members 26 that is loose at one end is held against upward movement, so as to be maintained flush with the other cross members, by a U-strap 33 which has its intermediate portion extending over the loose member 26 and has its end portions extending beneath the adjacent cross members 26, as clearly shown in Figure 4. These clips 33 permit the free ends to slide endwise when said loose members 26 are bent or flexed.

At some suitable intermediate point, each of the loose members 26 is yieldingly supported in raised position by coil springs 34 which surround bolts 35 that connect the loose members 26 with the frame 27 and that limit upward movement of the loose members 26. The under face of each of the loose members 26 is provided with an electric contact 36 adapted to co-operate with a stationary electric contact 37 mounted on one of a number of supporting members 38 which member is interposed between the frame 27 and the loose member 26, said supporting members 38 being provided with holes 39 to accommodate the springs 34 and bolts 35. Since the end portions of the loose members 26 are held against upward movement, said loose members are normally flexed between the ends by the expansive force of the springs 34, so that said loose members assume an upwardly bowed shape, as clearly shown in Figure 3, and when thus bowed the loose members 26 have their upper faces above the level of the upper faces of the next adjacent fixed cross members 26.

As clearly shown in Figure 9, the contact 36 is connected by a wire 40 to a suitable source 41 of electric current, which source, in turn, is connected by a wire 42 to an electrically actuated signal 43 of any suitable construction. The signal 43 is connected by a wire 44 to the contact 37. The signal 43 may be either one that is visible to the eye or one that makes a sound, and the signal illustrated in Figure 9 is of the latter mentioned type, whereas there are illustrated in Figure 5 other signals 43 that produce a visible effect and which are in the form of electric lamps. Thus, the contacts of different switches may be connected with different kinds of signals so as to produce a variety of effects as the automobile traverses the runway from end to end.

In this particular instance, the lamps 43 are mounted on the side walls of a shed 45 that covers a portion of the runway. If desired, other lamps 46 may be mounted beneath the roof of the shed and permanently lighted for properly illuminating the shed. The lamps 43 may be colored or may be of different colors.

The construction and operation of the invention will be readily understood from the foregoing description and, briefly stated, the operation is as follows:

The operator of an automile will drive onto the runway at the entrance 23 and will traverse said runway at a safe speed as, for example, not over 20 or 25 miles an hour. The body of the automobile, as it traverses the hills and dales of the runway, because of the vehicle's springs, will be given an easy up-and-down motion that may be more or less rythmical, depending upon the spacing of the hills and dales and speed of the automobile. When the automobile rides upon the portion or portions of the runway supported by cables, the runway will yield somewhat under the weight imposed on it and this wave-like effect will progress with the automobile. As the automobile crosses the various loose members 26 of the runway, the different switches will be closed and there will be produced an effect that depends upon the character of the electrically operated device connected with the particular switch that is actuated. Thus may be produced sounds of various kinds, flashing of colored lights, et cetera.

Preferably, the entrance and exit ends of the runway sections 17 are closer together than the other ends of said sections 17, thus causing the sections 17 to converge toward the entrance and exit. This tends to cause the motorists coming from the runway to drive their cars toward the entrance, thus leading them to repeat the ride over the runway. The repetition of the ride is further encouraged by reason of the outer rails 25 extending past the inner rails 25, and said inner rails have portions 47 that project toward one another.

The members 38 constituting stringers of the frame 27 are preferably supported at such intervals as to permit of said stringers flexing somewhat under the weight of the automobile and its passengers so as, in a measure, to secure the same effect as produced by riding over the portion of the runway that is supported by the cables.

I claim:

1. An auto thriller and amusement apparatus comprising a hill and dale runway for automobiles, said runway including cross members, one of said cross members being movably mounted, an electric contact connected with the movably mounted cross member, a stationarily mounted electric contact engageable by the first mentioned electric contact when the movably mounted cross member is depressed, and an electrically operated signal electrically connected with said contacts.

2. An auto thriller and amusement apparatus comprising a hill and dale runway for automobiles, said runway including members extending crosswise of the runway, electric switches, electrically operated signals electrically connected with the respective switches, one of said signals operating to produce a sound and another of said signals producing a visible signal, each of said switches being operable by depression of one of the cross-members of the runway.

3. An auto thriller and amusement apparatus comprising a hill and dale runway for automobiles, said runway including longitudinally extending cables, anchors securing the opposite ends of the cables, a frame supporting said cables, and cross members mounted on said cables for producing a supporting surface for the automobile.

4. An auto thriller and amusement apparatus comprising a hill and dale runway for automobiles, including a movably mounted cross member, an electric contact connected with the under face of said cross member, a stationarily mounted electric contact adapted to be engaged by the first mentioned contact upon depression of said cross member, a spring yieldingly supporting the cross member between its ends, and an electrically operated signal electrically connected with said contacts.

5. An auto thriller and amusement apparatus comprising a hill and dale runway for automobiles, said runway including a cross member held at its ends against upward movement, a means yieldingly bowing said cross member upwardly, an electric contact connected with the under face of said cross member, a stationarily mounted electric contact engageable by the first mentioned contact upon depression of the upwardly bowed portion of the cross member, and an electrically operated signal electrically connected with said contacts.

6. An auto thriller and amusement apparatus comprising a frame, a hill and dale runway for automobiles mounted on said frame, said runway including a cross member fixed at one end to said frame and slidably supported at its other end to permit of elongation of said cross-member when depressed, a spring yieldingly supporting said member between its ends, an electric contact connected with the cross member, a stationarily mounted electric contact engageable by the first mentioned contact upon depression of the cross member, and an electrically operated signal electrically connected with said contacts.

7. An auto thriller and amusement apparatus comprising a hill and dale runway for automobiles, the runway including longitudinally extending stringers supported at such intervals as to permit of flexure of the stringers under the weight of an automobile and its passengers, and said runway including cross members mounted on said stringers.

Signed at Los Angeles, Calif., this 3rd day of May, 1929.

HARRY ROCKS, Jr.